April 24, 1962

C. M. ZENT 3,031,368

TAPING MACHINE

Filed Feb. 8, 1961

INVENTOR.
CLAYTON M. ZENT
BY Bosworth, Sessions
Herrstrom & Knowles
ATTORNEYS.

April 24, 1962
C. M. ZENT
3,031,368
TAPING MACHINE
Filed Feb. 8, 1961
7 Sheets-Sheet 2
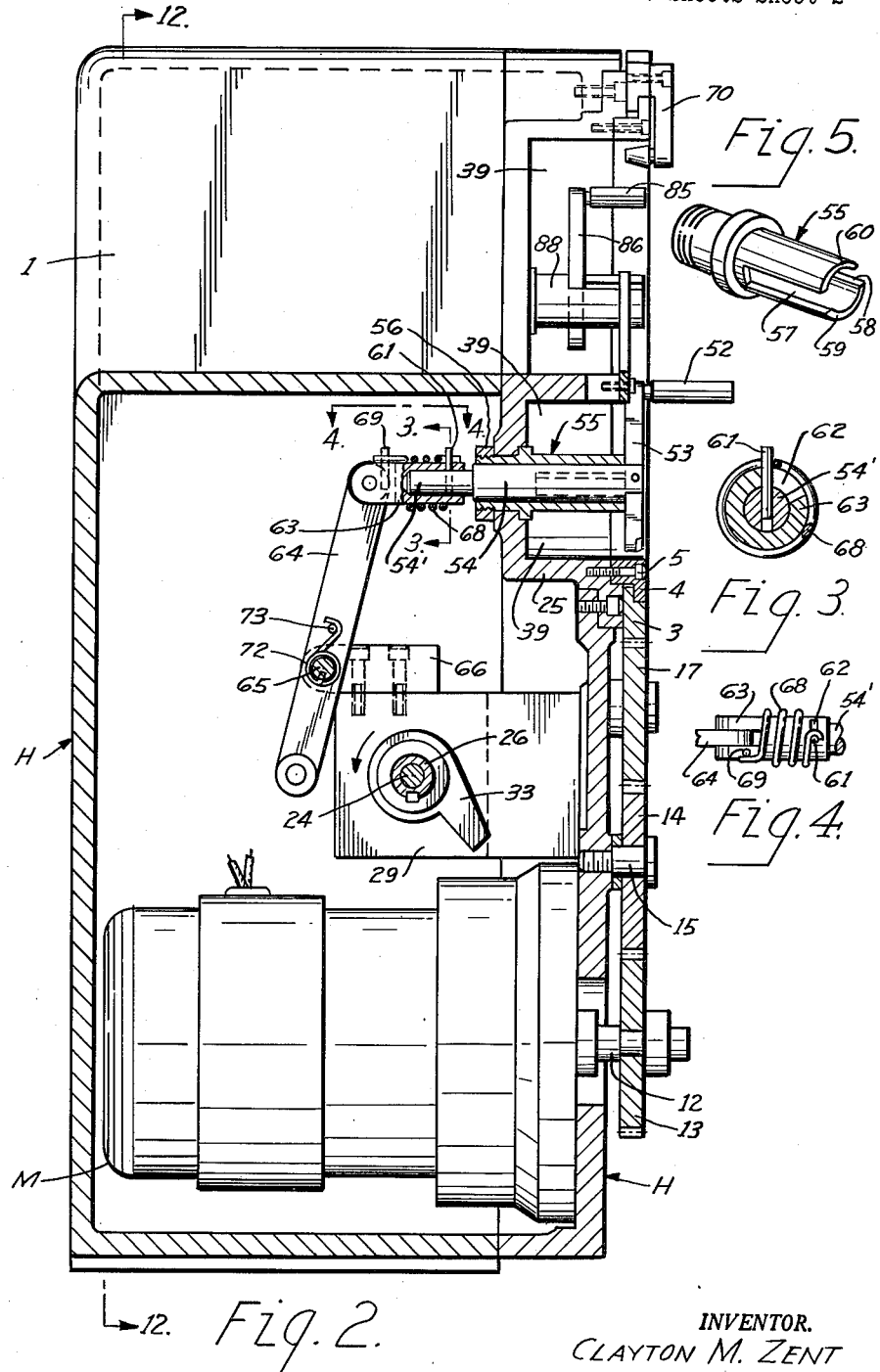
INVENTOR.
CLAYTON M. ZENT
BY Bosworth, Sessions
Herrstrom & Knowles
ATTORNEYS.

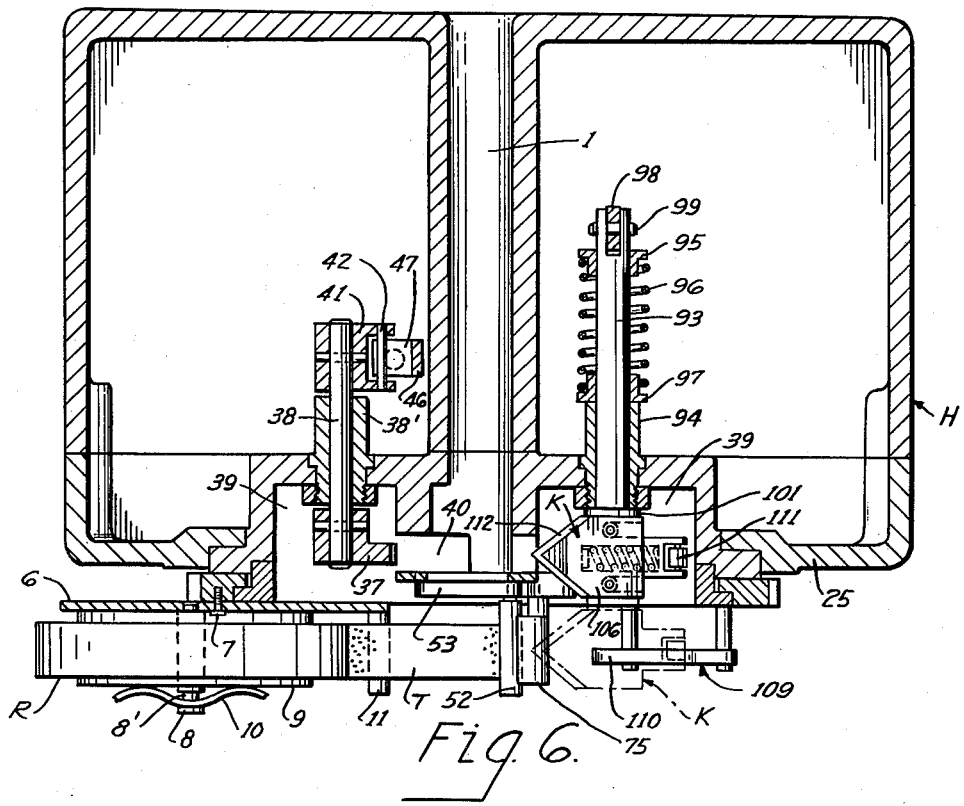

April 24, 1962 C. M. ZENT 3,031,368
TAPING MACHINE
Filed Feb. 8, 1961 7 Sheets-Sheet 4

INVENTOR.
CLAYTON M. ZENT
BY Bosworth, Sessions
Herrstrom & Knowles
ATTORNEYS.

April 24, 1962　　　　　　C. M. ZENT　　　　　　3,031,368
TAPING MACHINE
Filed Feb. 8, 1961　　　　　　　　　　　　　　　　7 Sheets-Sheet 7
Fig. 15.　　　Fig. 16.　　　Fig. 17.
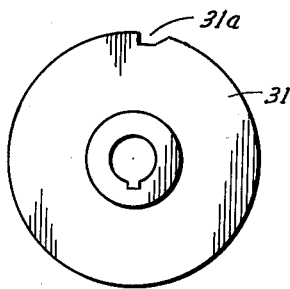
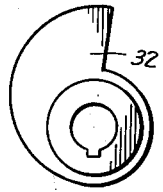
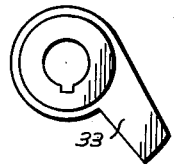
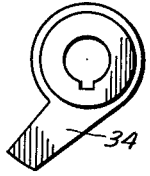
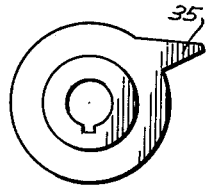
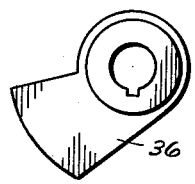
Fig. 18.　　　Fig. 19.　　　Fig. 20.
INVENTOR.
CLAYTON M. ZENT
BY Bosworth, Sessions
Bergstrom & Knowles
ATTORNEYS.

United States Patent Office 3,031,368
Patented Apr. 24, 1962

3,031,368
TAPING MACHINE
Clayton M. Zent, Marion, Ohio, assignor to Automatic Spot Taping Machine Co., Marion, Ohio, a corporation of Ohio
Filed Feb. 8, 1961, Ser. No. 87,814
18 Claims. (Cl. 156—486)

This invention relates to taping machines and more particularly to spot taping apparatus for applying adhesive tape or other binding material to an article, such as a group of wires or the like, to hold same in assembled relation.

Electrical wiring "harnesses" are commonly used in the automotive, electrical appliance and many other fields. Such a harness consists of an assembly of wires cut to the proper lengths and assembled in a group or bundle which can be easily installed in the apparatus being manufactured and which greatly simplifies the electrical wiring thereof. In the manufacture of these harnesses a group of wires of proper size and length is assembled together and is then spot taped at a number of points along its length by wrapping several turns or wraps of tape around the group or bundle of wires. After this "spot" taping operation the harness may either be taped throughout its length or may be installed directly in its place of use. Prior to the present invention such spot taping operations have been done manually by operators who cut short lengths of tape from a roll and then wind them by hand individually around the bundle of wires at the proper locations.

The prior practice referred to above is time consuming and expensive and accordingly it is an object of the present invention to provide an apparatus which will positively and effectively wind binding tape or the like around any article or group of articles to which such material may advantageously be applied. Further objects of my invention include the provision of an automatic taping machine which may be set to wind any desired number, within designed limits, of wraps of tape to the article being taped; the provision of an automatic taping machine which upon completion of one taping operation will be ready for the next without special attention by the operator; the provision of a taping machine which, at the completion of a taping operation, will cut off the tape and smooth down the severed end on the article being taped; the provision of a taping machine in which the tape is firmly held against the article being taped during the initial winding; and the provision of a compact, rugged and efficient taping machine which may be used singly or in groups to apply one or more tape bindings to an article in a minimum of time and which, after completion of one taping operation, is immediately ready for another.

The above and other objects of my invention will appear from the following description of one embodiment thereof, reference being made to the accompanying drawings in which:

FIGURE 2 is a vertical cross-sectional view taken substantially in line 2—2 of FIGURE 1 and also indicated at line 2—2 on FIGURE 12;

FIGURE 3 is a cross-sectional view taken on line 3—3 of FIGURE 2 and illustrating a detail of the stop finger actuating mechanism;

FIGURE 4 is a fragmentary detached view taken substantially on line 4—4 of FIGURE 2 and illustrating a part of the stop finger actuating mechanism;

FIGURE 5 is a detached perspective view of the split or slotted sleeve for supporting the stop finger actuating shaft;

FIGURE 6 is a horizontal cross-sectional view taken substantially on line 6—6 of FIGURE 1;

FIGURE 7 is an enlarged detached plan view of the tape cut off knife and its support taken substantially on line 6—6 of FIGURE 7;

FIGURE 8 is a cross-sectional view taken substantially on line 8—8 of FIGURE 7;

FIGURE 15 is a detached view of the switch cam as it appears if looked at from the lefthand end of its tubular supporting shaft as seen in FIGURE 9, the cam being angularly positioned as it is when the machine is in "off" or idle condition with the clutch engaged;

FIGURE 16 is a view similar to FIGURE 15 but illustrating the clamp cam;

FIGURE 17 is a view similar to FIGURE 15 but illustrating the stop finger cam;

FIGURE 18 is a view similar to FIGURE 15 but illustrating the tape gripper finger cam;

FIGURE 19 is a view similar to FIGURE 15 but illustrating the anti-slip finger cam;

FIGURE 20 is a view similar to FIGURE 15 but illustrating the knife cam.

Figure 1:
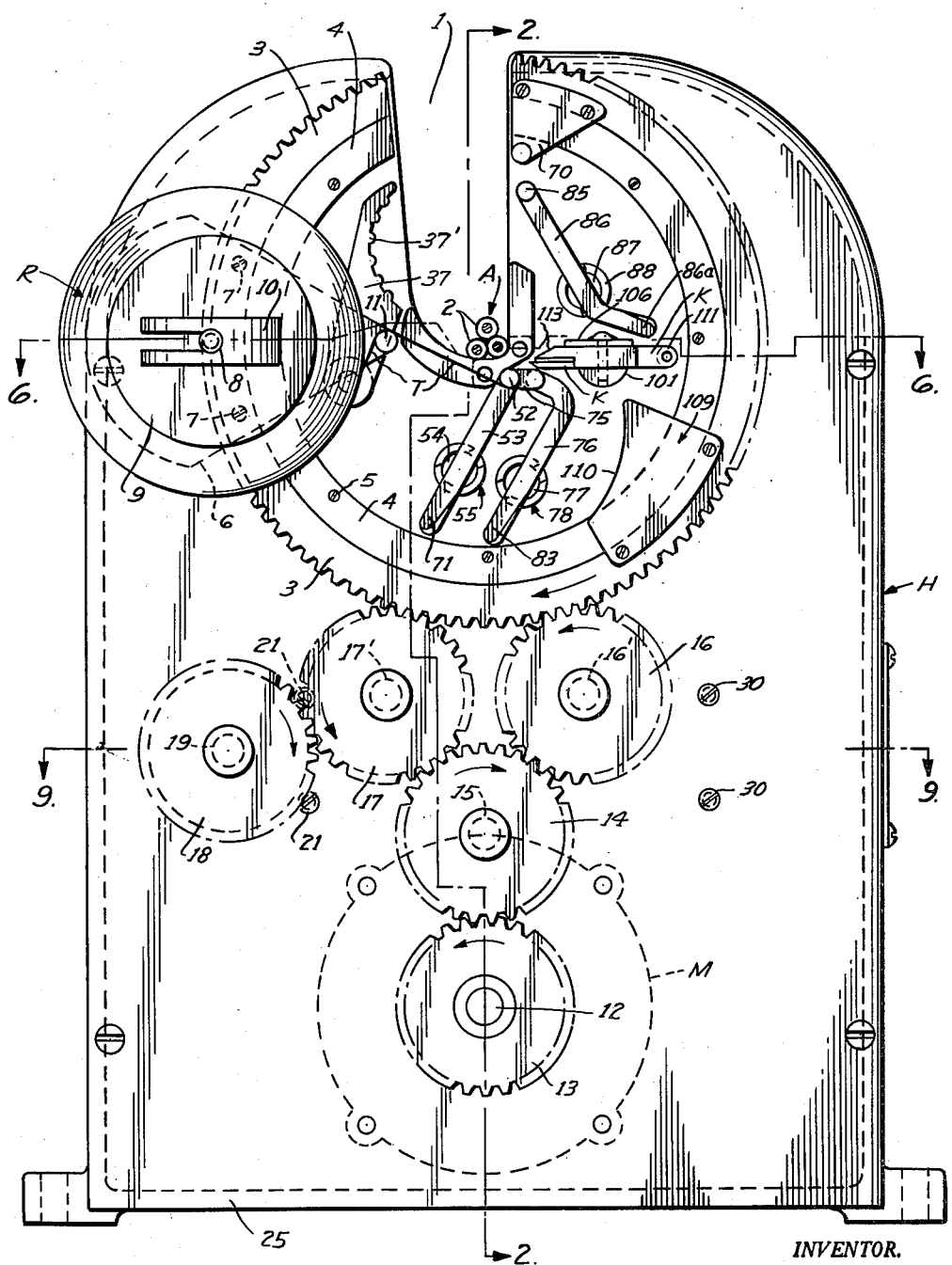
FIGURE 1 is a front elevation of my improved taping machine.

Referring to the drawings, as is clearly seen in FIGURES 1 and 2, my taping machine includes a frame or housing H which has an article or work receiving open top and open ended notch or slot 1 extending downwardly from the top and from the front to the rear of the housing. The article A that is to be taped together (comprising three wires 2 as seen in FIG. 1) is positioned in the slot 1 and extends therethrough from front to rear of the housing H. It will be apparent that the article A to be taped may be dropped into the open top of slot 1 regardless of its length, and, by moving it lengthwise of the slot 1, the point at which it is desired to apply the tape may readily be aligned with the roll R of tape T so that the tape binding will be properly located along the length of the article. It will be understood that where the word "tape" is used herein it includes any suitable binding material such as flat ribbon-like strands, cord, wire, etc.

The bottom of the slot 1 is so contoured, as seen in FIGURE 1, that articles A of a rather wide range of cross-sectional dimensions can be handled, varying from quite small up to substantially the width of the bottom of slot 1.

To effect winding of the tape T around the article A a split tape winding ring 3 having a gap or slot therein, is rotatably supported on the front wall portion 25 of the housing H by a slotted retainer ring 4 (see FIGURES 1 and 2) which is secured to the housing H as by screws 5. The ring 3 is split or slotted to provide a gap which, in the machine "off" position seen in FIGURE 1, is aligned with the slot or notch 1 in the housing H and is substantially equal in width thereto. When so aligned the top end of notch 1 is open, thus permitting the articles to be taped to be dropped into the slot.

A roll R of binding tape, which is preferably of the self-sealing adhesive type, is rotatably supported on a pin 8 mounted on a carrier plate 6 (see FIGURES 1 and 6) which is attached to the winding ring 3 as by screws 7. The roll R is held in position by a cover plate 9 which is secured in position by a resilient slotted retaining clip 10 which applies an inward force to plate 9 to give the desired frictional resistance to rotation of the roll R during the taping operation. When a new roll R is to be installed it is only necessary to slip the spring clip 10 out of the notch 8' in the end of the pin 8 (see FIG. 6), thus permitting removal of the friction plate 9 and installation of a new roll of tape.

The center of the rotatable split winding ring 3 is adjacent the center of the slot 1 at the bottom thereof. As seen in FIGURES 1 and 6, the inner portion of the tape roll carrier plate 6 extends inwardly beyond the periphery of the roll R of the tape and carries a winding pin 11 which is disposed to engage the outside (the non-sticky side) of the tape T and, as will appear more clearly later, wind the tape around the article A which consists of a group of wires 2 that are to be bound together.

From the previous description it will be understood that if the ring 3 is rotated on the housing H in clockwise direction as seen in FIGURE 1, after the end of the tape T from the roll R has been passed up over the upper surface of winding pin 11 and then caused to engage the article A in the slot 1, the tape will be moved in a rotary winding path around the article A as the ring 3 rotates. Ring 3 carries the roll of tape R in an orbital path around article A and causes the tape T to be unwound from the roll R and wound around the article. For each full revolution of the ring 3 one layer of tape will be wound on the article A and, by continuing the movement of the tape in its winding path for the proper number of revolutions, any desired number of layers or wraps can be applied. This "winding path" of the tape, as the term is used herein, includes the space swept by the tape roll R and the length of tape that extends from roll R to article A as the ring 3 rotates during a taping operation.

It will also be understood that in some cases it may be desired to apply tape in an overlapping or spiral winding along the length of an article. This may be accomplished with my apparatus by moving the article longitudinally of the slot 1 or vice versa, while the ring 3 rotates, thus causing the tape T to be wound spirally along the desired length of the article. The illustrated apparatus, however, is primarily intended to provide a fully automatic and effective means for applying any desired number of overlying layers of tape to the objects to be bundled together.

In order to rotate the tape winding ring 3, and to operate the other elements of my apparatus, I provide a driving means in the form of an electrical motor M mounted in the lower portion of the frame or housing H and having a shaft 12 extending out through the front wall thereof. Secured to shaft 12 is a gear 13 which meshes with gear 14 disposed vertically thereabove and supported on a stub shaft 15 secured to the front wall portion 25 of housing H. Gear 14 in turn meshes with a pair of gears 16 and 17 which are supported on stub shafts 16' and 17' which are in turn mounted on the front wall 25 of housing H in the same manner as shaft 15.

The outer periphery of the split tape winding ring 3 is provided with teeth which mesh with the gears 16 and 17. As will be clear from FIGURE 1, the gap in the split ring 3 which permits the articles to be taped to be dropped into the slot 1 is of such width that the teeth of one side or the other of the gap will always be in engagement with either the gear 16 or 17 and thus, when the motor M and the gears 14, 16 and 17 are driven in the direction of the arrows of FIGURE 1, the tape winding ring 3 will be continuously and uniformly rotated in clockwise direction. The gear 17 also meshes with a cam drive gear 18 mounted on the outer end of the shaft 19 which extends through and has a bearing in the front wall portion 25 of the housing H as is clearly seen in FIGURE 9. The other end of shaft 19 is supported in a bearing in the end portion 20' of the bracket member 20 which, as was best seen in FIGURE 9, is secured to the front wall 25 of housing H by screws 21.

Figure 9:
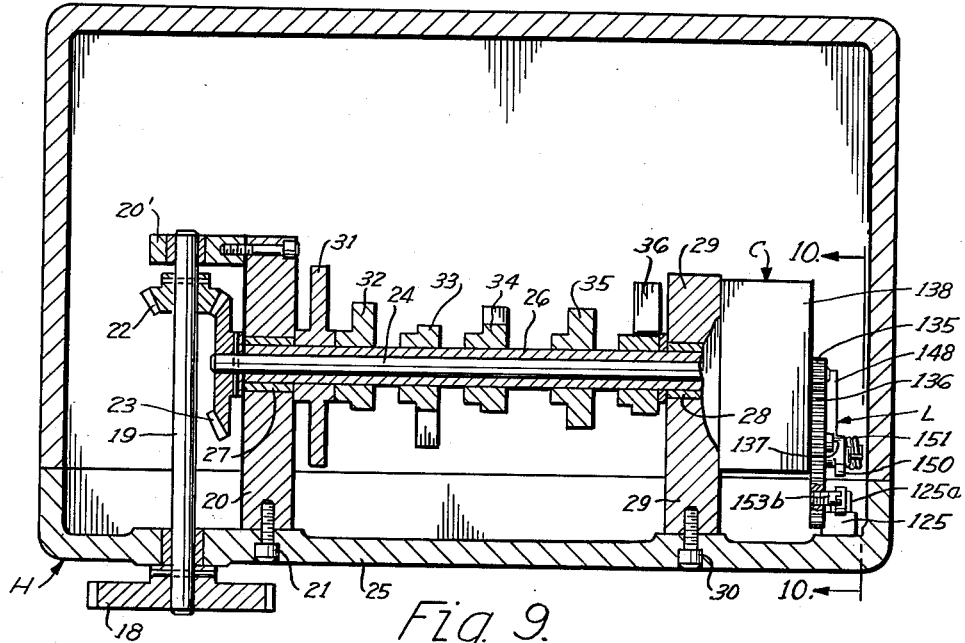
FIGURE 9 is a horizontal cross-sectional view taken substantially on line 9—9 of FIGURE 1.

Mounted on and secured to the shaft 19 is a bevel gear 22 which is positioned to mesh with a second bevel gear 23 mounted on one end of the inner cam drive shaft 24 which extends transversely across the housing H and is spaced inwardly from the front wall 25 thereof as is clearly seen in FIGURE 9. This inner drive shaft 24 extends through and is rotatably supported by the tubular cam support shaft 26 which in turn is rotatably supported at one end (adjacent the bevel gear 23) in a bearing 27 in the bracket 20. The other or clutch end of tubular shaft 26 is rotatably supported in bearing 28 in bracket 29 which is secured to the front wall 25 of housing H by screws 30 and which is aligned with and parallel to the bracket 20.

An automatic clutch unit C, the arrangement and a function of which will be fully described later, is mounted on the outer face of bracket 29 and is adapted to establish driving connection between the inner cam drive shaft 24 and the outer tubular cam support shaft 26 when such driving connection is required. Keyed to and rotatable with the tubular cam shaft 26 is a series of actuating cams which form a part of the control means which is operated by the motor M, as it drives the winding ring 3, to effect the properly timed movements of the several fingers and the cut-off knife which will presently be described. As they are seen from right to left in FIG. 12 and from left to right in FIG. 9, these cams are identified as follows: switch cam 31, article clamp cam 32, stop finger cam 33, tape gripper finger cam 34, anti-slip finger cam 35, and knife cam 36. As will be explained later, these cams are contoured and mounted to actuate in proper timed relation certain of the several elements of the apparatus which effect the operations required to carry out a complete taping cycle. These several elements will now be described.

Figure 12:
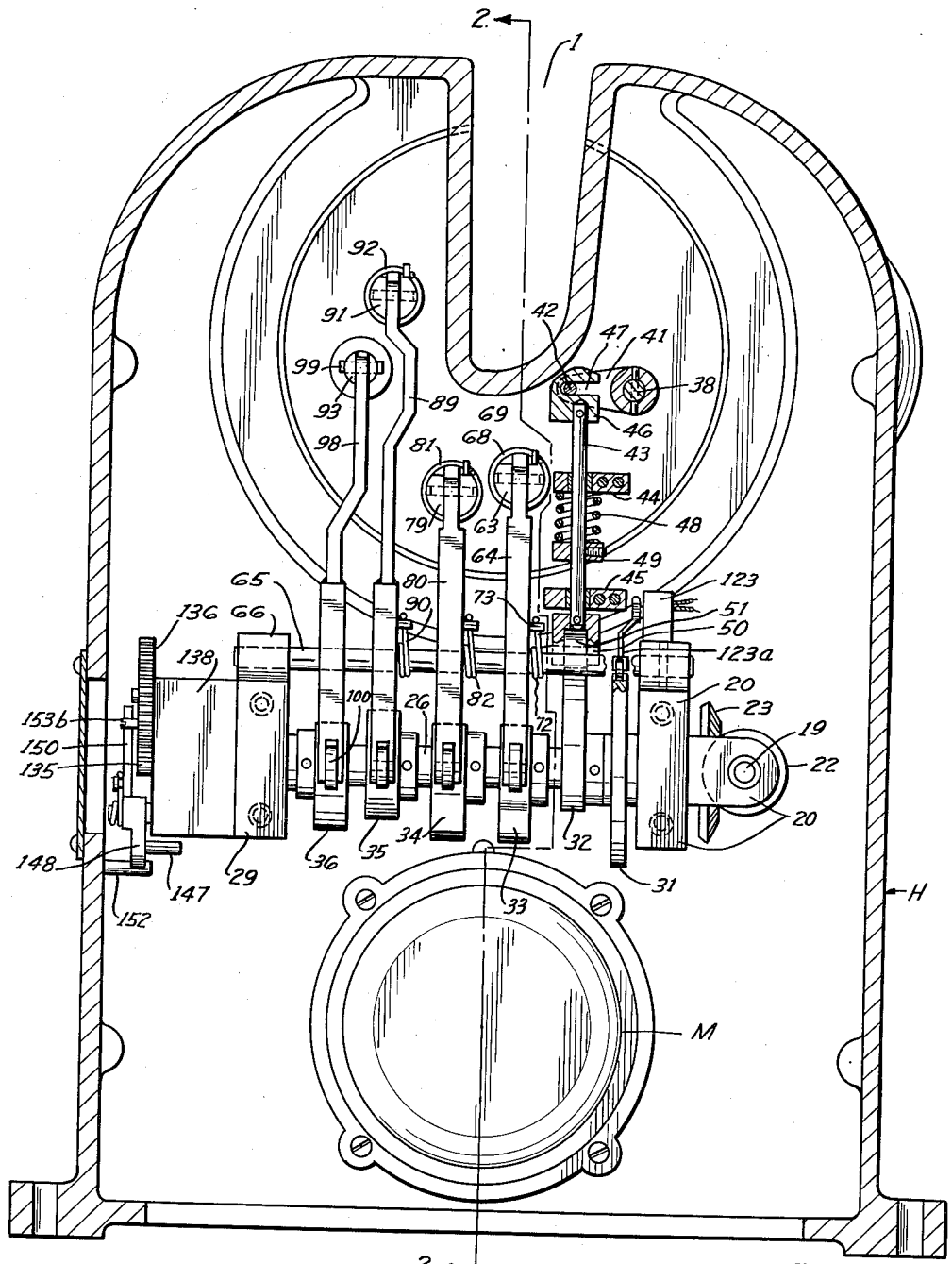
FIGURE 12 is a vertical cross-sectional view taken substantially on line 12—12 of FIGURE 2 and looking into the taping machine housing from the rear thereof.

Referring particularly to FIGURES 1, 6 and 12, the article clamp member 37 is mounted on the outer end of a shaft 38 which is rotatably supported in a suitable bearing 38' mounted in the front wall portion 25 of housing H. As seen in FIGURE 1, the clamp 37 is in its retracted or non-gripping position. This is its position when the machine is in its "off" condition ready to receive an article to be taped. It may be noted here that all of the views of the drawings illustrate the machine parts in their "off" positions. When this "off" condition exists the article receiving slot 1 is open and unimpeded (see FIGURE 1) thus permitting the article A to be taped (comprising a group of three wires 2 as seen in FIG. 1) is dropped into the slot 1 so that it is supported at the right-hand (FIG. 1) side of the curved bottom thereof where it is disposed substantially at the center of the split ring 3.

Reverting to the clamp member 37, it is seen from FIGURE 6 that it is disposed in the recess 39 formed in the front wall portion 25 of the housing H. This recess 39 is generally cylindrical and extends inwardly from the inner diameter of ring 3. The bottom of the notch or slot 1 is cut away at 40 (FIG. 6) to permit the serrated clamping face 37' of clamp 37 to swing down from the position seen in FIGURE 1 in clockwise direction until the clamp face 37' engages the article A to hold it firmly in position in the bottom of the slot 1 during the taping operation.

To effect this clamping action of member 37, and to release it when a taping operation is completed, a crank arm 41 carrying a crank pin 42 is secured to the inner end of shaft 38. When the clamp 37 is in its retracted position this crank arm 41 extends generally horizontally as seen in FIGURE 12. An operating rod 43 is slidably supported in brackets 44 and 45 mounted on the front wall 25 of the frame or housing H. The upper end of rod 43 carries a yoke member 46 having a slot 47 therein in which the pin 42 has a close sliding fit. Compression spring 48 surrounds the rod 43 and extends between the fixed bracket 44 and a collar 49 secured on rod 43. As this spring is maintained under compression it at all times urges the rod 43 downwardly (as seen in FIG. 12) and thus tends to rotate the crank arm 41 in a direction to effect clamping action (clockwise as seen in FIG. 1). The lower end of rod 43 carries a bifurcated support member 50 for the cam follower roller 51 which is held in engagement with the face of the clamp cam 32 by the spring 48. This cam 32 is so contoured, and so angularly located on the tubular shaft 26 (see FIG. 16), as to effect the desired operation of clamp member 37 when shaft 26 is rotated during a taping operation as will be later described.

Referring now particularly to FIGURES 1, 2 and 6, the tape stop finger 52 comprises a rotatable pin supported on the end of an arm 53 and so positioned that when the machine is in "idle" condition the tape T (as seen in FIGURES 1 and 6) passes below the pin 52 and about half way around same. The inner sticky side of the tape T engages the finger 52 and, as will appear later, this pin in conjunction with the gripper finger 75 which will be later described, holds the end of the tape during initial winding and also holds the trailing end of the tape while it is being cut off at the completion of a winding operation.

The support arm 53, which carries the rotatably mounted stop finger member 52, is secured to the outer end of a shaft 54 which in turn is rotatably supported in a split bushing, generally indicated at 55, carried in the front wall portion 25 of the housing H. As clearly seen in FIGURES 2 and 5 this bushing 55 is clamped in position by a nut 56 and is thus fixed in the housing H. The bushing 55 has opposed slots 57 and 58 (FIG. 5) extending inwardly from its outer end. When the stop pin 52 is in its extended or tape engaging position as seen in FIGURES 2 and 6, the inner face of the support arm 53 engages and rests upon the end faces 59 and 60 of bushing 55. The width of arm 53 is such that if it is rotated into alignment with the slots 57 and 58 it will enter these slots and will be retracted thereinto, thus moving the stop finger 52 into the recess 39 in the front face of the housing H and out of the path of the tape while it is being wound around the article A.

To effect this retracting movement of arm 53 and finger 52 the inner end of shaft 54 is reduced as seen at 54′ (see FIGS. 2, 3 and 4) and pin 61 is secured to inner end 54′ of shaft 54 and extends outwardly through a circumferentially extending slot 62 in the socket member 63. The inner end of socket member 63 is pivotally secured to the upper end of operating arm 64 which in turn is rotatably mounted on the non-rotatable shaft 65. As seen in FIGURES 2 and 12 one end of the shaft 65 is supported in a bracket 66 mounted on the top of bracket 29 and the other end supported in and anchored to a bracket 67 mounted on the top of bracket 20.

A torsion spring 68 surrounds the socket member 63 and has one end engaging the pin 61 in the shaft end portion 54′ and its other end engaging a fixed pin 69 mounted on the socket member 63. This torsion spring 68 at all times urges the shaft 54 in counter-clockwise direction as seen in FIGURE 1 to move the finger 52 into its operating position and hold same in that position with the pin 61 against the left-hand end (FIG. 3) of slot 62.

As previously noted, when the stop finger 52 and arm 53 are in extended or operating position the inner face of arm 53 is in engagement with the end faces 59 and 60 of split bushing 55. Before the finger 52 and arm 53 can be retracted (by moving to the left as seen in FIG. 2) arm 53 must be rotated in a clockwise direction as seen in FIGURE 1 far enough to permit arm 53 to be aligned with the slots 57 and 58 in split bushing 55. When this alignment occurs due to engagement of the finger retracting or reset cam 70 with the projecting end 71 of arm 53 as will be later described, the spring 72 (one end of which is anchored to shaft 65 and the other end of which engages a pin 73 on arm 64) rotates arm 64 in counter-clockwise direction as seen in FIGURE 2, thus moving the socket member 63 and shaft 54 inwardly because of the pin and slot connection 61—62 therebetween, and causing the arm 53 to enter the slots 57 and 58 in the bushing 55. At the same time, of course, the stop finger 52 will be retracted into the recess 39 in the front wall of the housing H out of the path of the tape as it is moved around the article A.

To again move the shaft 54, arm 53 and finger 52 outwardly into operating position it is necessary to move the lower end of arm 64 to the left or clockwise as seen in FIGURE 2. This is effected at the proper time in the cycle by the stop finger cam 33, the angular position of which on tubular shaft 26 may be clearly seen in FIGURES 2 and 17.

When the arm 53 has moved outwardly in the slots in the bushing 55 until its inner face just clears the end faces 59 and 60 of bushing 55 the torsion spring 68 will immediately rotate shaft 54 relative to bushing 55 in counter-clockwise direction as seen in FIGURE 1 until pin 61 engages the end of its slot 62 in socket 63 (see FIGURE 3) whereupon arm 53 and finger 52 will stop in their outer operating positions as seen in FIGURES 1, 2 and 6. From the above it will be understood that the stop finger 52 is moved from its extended or operating position of FIGURES 1 and 2 into retracted position when the finger retracting or reset cam 70, which is mounted on and moves with the rotatable split ring 3, engages the end 71 of arm 53 swinging it in clockwise direction as seen in FIGURE 1 until arm 53 aligns with the slots 57 and 58 in bushing 55 whereupon spring 72 immediately swings operating arm 64 and pulls shaft 54, arm 53 and finger 52 back into retracted position within the recess 39 in the end wall portion 25 of housing H. During the clockwise rotation of arm 53 by the cam 70 the end of the tape T will be pulled off from finger 52, this action being facilitated by the fact that finger 52 is rotatably mounted on the upper end of arm 53.

The gripper finger 75 extends parallel to the stop finger 52 and has its adjacent face grooved or recessed to approximately the same radius as rotatable stop finger 52. When in gripping position, which is its condition when the apparatus is idle or "off," this grooved face of gripper finger 75 grips the tape T between itself and the outer surface of finger 52 and holds the end of the tape firmly in position during the starting of the winding operation and during the final cut-off operation as will appear more fully later.

The support and operating means for gripper finger 75 are very similar to those just described in connection with stop finger 52 and they function in substantially the same manner. Thus, the gripper finger 75 is carried by an operating arm 76 mounted on the end of a rotatable shaft 77 which corresponds to shaft 54. This shaft 77 extends through a split bushing 78 which corresponds to bushing 55 and is similarly slotted. As seen in FIGURE 12, a socket member 79 is disposed at the inner end of shaft 77 and is pivotally secured to the upper end of operating arm 80. A torsion spring 81 surrounding socket member 79 tends to rotate shaft 77 and arm 76 in counter-clockwise direction as seen in FIGURE 1 and to hold the gripper member 75 in gripping position.

A spring 82 acts on arm 80 and serves to retract shaft 77, arm 76 and gripper finger 75 into the recess 39 in the front wall of the frame H when arm 76 is rotated into alignment with the slots in the bushing 78 by engagement of the finger reset cam 70 with the lower end 83 of arm 76. To move arm 80 in a direction to cause shaft 77 to move arm 76 outwardly until it is clear of the ends of the slots in the split bushing 78, the gripper finger cam 34 is provided. Its contour and angular position on the tubular shaft 26 are indicated in FIGURE 18 and the timing of the operation of gripper finger 75 will be explained later.

An anti-slip finger 85 is also operatively supported in the same general manner as stop finger 52 and gripper finger 75. When the apparatus is in its "off" position as seen in the drawings, the anti-slip finger 85 is retracted and withdrawn into the recess 39 in the housing H as is clearly seen in FIGURE 2. Finger 85 is carried on a supporting arm 86 which in turn is mounted at the outer end of shaft 87. This shaft 87 is rotatable in a slotted bushing 88 which corresponds in general form and function to the bushings 55 and 78 previously referred to and is similarly slotted. As best seen in FIGURE 12, an operating arm 89 is pivotally mounted on shaft 65 and a spring 90 tends to rotate arm 89 in a direction (to the left as seen in FIG. 2) to retract shaft 87, arm 86 and anti-slip finger 85.

As illustrated in FIGURE 2 the arm 86 is disposed at the bottom of the slots in the bushing 88 and the anti-slip finger 85 is fully retracted into the recess 39 in the front wall 25 of housing H. In order to move the anti-slip finger 85 out into operating position the anti-slip finger cam 35 (see FIG. 19) will engage the follower roller at the lower end of arm 89 and will move it in a direction to cause the upper end of arm 89, socket member 91, shaft 87, arm 86 and anti-slip finger 85 to move outwardly (to the right in FIG. 2) until the arm 86 clears the end of bushing 88 whereupon the torsion spring 92, which corresponds to torsion springs 68 and 81 previously described, will rotate shaft 87 and arm 86 in counter-clockwise direction from the position seen in FIGURE 1 until the anti-slip finger 85 engages and holds the first wrap of the tape T against the article A that is being taped to prevent the end of the tape from being pulled loose from the article during the start of the winding operation. The function of anti-slip finger 85 and its timing relative to the other elements of the machine will be more fully described later but it will be apparent from the above description that its support means and mode of operation are generally similar to those of stop finger 52 and gripper finger 75.

In order to cut off the tape T upon completion of one taping operation and preparatory for the next taping operation, a retractable and reciprocable knife K is supported on the outer end of a longitudinally movable shaft 93. As best seen in FIGURES 1, 6, 7 and 8, shaft 93 is slidably supported in a bushing 94 which extends through the front wall 25 of the frame or housing H into the recess 39 therein. A collar 95 is secured to shaft 93 adjacent its inner end and a spring 96 extends bebtween collar 95 and a stationary collar 97 and tends at all times to urge shaft 93 and knife K into their withdrawn or retracted positions as seen in FIGURE 6. When in this retracted position the knife K lies within recess 39 and does not interfere with the tape winding operation during rotation of the split ring 3.

An operating arm 98 is pivotally connected at its upper end to the shaft 93 by means of a pin 99. This arm 98 is in turn pivotally supported on the fixed shaft 65 and has at its lower end a cam follower roll 100 which is held in contact with the peripheral face of knife cam 36 by the action of spring 96. The contour of cam 36, and its angular position on the cam supporting shaft 26, is such that (see FIGS. 13 and 20) when the machine is in "off" position shaft 93 and knife K will be in the retracted positions seen in FIGURE 6. At the appropriate time in the cycle of operation of the machine, and as will be referred to more fully later, the cam 35 is effective to move the arm 98 and shaft 93 toward the front of the machine until the knife K reaches its operative or cutting position seen in phantom lines in FIGURE 6. Cam 35 holds the knife in this cutting position until the cutting operation is completed and then permits the spring 96 to retract shaft 93 and knife K back into the recess 39 as seen in full lines in FIGURE 6.

The above described in and out movement of knife K and shaft 93 is necessary to place the knife in cutting position at the end of a taping operation and then withdraw it out of the path of the tape preparatory to the next winding cycle. In order to permit and effect the actual cutting movement of the knife relative to the tape T, the knife K, as best seen in FIGURES 6, 7 and 8, is supported on an enlarged flattened end portion 101 of shaft 93 and is adapted to move thereon transversely of the axis of shaft 93 and generally radially of the winding ring 3. To permit this tape cutting movement of knife K it is provided with slots 102 and 103 through which extend guide pins 104 and 105 which are screwed into the enlarged end 101 and have heads, as seen at 104' in FIGURE 8, which hold the knife retaining plate 106 in position to permit knife K to have reciprocating sliding movement on the flat upper face of the enlarged end 101 of shaft 93.

Referring particularly to FIGURE 8, the underside of knife member K is recessed where it overlies the flat face of end 101 and a spring 107 is maintained in compression between the right-hand (FIG. 8) end of this recess and a stop pin 108 mounted in the end portion 101. Accordingly, the knife K is normally held in its non-cutting position relative to the shaft 93 and its end portion 101 as seen in FIGURE 6 in both full and phantom lines.

Upon completion of the tape winding operation the knife K is moved out into cutting position (phantom lines in FIG. 6) after which, at the proper time in the cycle, the knife actuating or cut-off cam 109, which is mounted on and rotatable with the split ring 3 as seen in FIGURE 1, will, during the rotation of ring 3 in clockwise direction as seen in FIGURE 1, engage the roller 111. The inclined face 110 of cam 109 will move the knife K to the left from the position seen in phantom lines in FIG. 6 until the pointed blade portion 112 cuts through the tape T which at this point in the operation will extend in a substantially vertical direction between the stop finger 52 and the article A being taped. When the cut-off cam 109 moves past the knife member K, its face 110 will be disengaged from the roller 111 permitting the spring 107 to quickly withdraw knife K back into the position seen in phantom lines in FIGURE 6. As is apparent from FIG. 1, the contour of the face 110 of cut-off cam 109 is such that the knife K will be progressively moved inwardly toward the center of rotation of ring 3 during its cutting movement, thus cleanly piercing and severing the tape T.

In order to smooth down the severed end of the tape T and cause it to adhere to the outer wrap of tape on article A after cut-off, the end of the knife portion K adjacent the point of blade 112 is relieved or tapered at 113 (FIGURE 8) in such a manner that, during the final portion of the advancing or cut-off movement of knife K on its support member 101 the inclined face 113 smooths or "irons" down the cut-off end of the tape tightly against the previous wrap of tape that has been wound on the article A. This eliminates the loose end which would otherwise be left after cutting-off the tape. It is further noted that blade 112 of the knife K is held in place by screws and thus may readily be replaced if it becomes dull or damaged.

The several operating elements of my improved taping machine, and their supporting and actuating mechanisms, have been described above. In order to effect a complete and automatic cycle of said elements, and thus complete a taping operation on an article to be taped, it is necessary to provide means whereby the operator, when the machine is in its idle or "off" condition, may start the motor M, the various operating elements will perform their several functions at the proper times, the desired number of winds or laps of tape will be applied to the article, and, after the tape has been cut off, the motor will be stopped with the elements again in idle or "off" positions ready for another taping operation.

Figure 14:
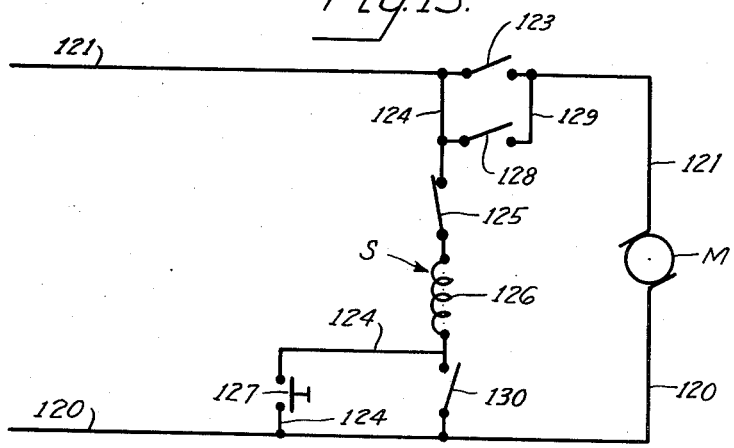
FIGURE 14 is a wiring diagram illustrating the major electrical connections to the taping machine drive.

Such means include a suitable electrical control circuit, illustrated in FIGURE 14, in which the motor M and the other elements are conventionally shown. This circuit has current supply lines 120 and 121 extending from a suitable source of electric current, such as 110 volt A.C. Line 120 extends from the current supply to one side of motor M while line 121 extends from the other side of motor M back to said current supply and has the cam actuated machine stop switch 123 interposed therein. A line 124 extends from line 121 through the clutch actuated switch 125 and the activating coil 126 of a relay generally indicated by the reference character S, and then through a normally open manually operable push-button type switch 127 to the line 120. The contact member 128 of relay S is disposed in a line 129 which extends from line 124 to line 121 on the motor side of switch 123. This contact 128 is open, as seen in FIGURE 14, when the coil 126 of relay S is de-energized and is closed when said coil is energized by the flow of current therethrough. Relay S also includes a holding contact 130 which is normally open as seen in FIGURE 14 but is closed upon energization of coil 126 of relay S.

The functions of the cam actuated switch 123 and the clutch actuated switch 125 will be more fully explained later. However, it is now pointed out that when the taping machine is in its idle or "off" position, ready for a taping operation, the electrical connections and switches are as seen in FIGURE 14. To start an operation the user momentarily closes the manual switch 127 which completes an electrical connection from line 120 through line 124, relay coil 126, closed clutch actuated switch 125 and line 124 to line 121. This, of course, immediately energizes coil 126 causing relay contacts 128 and 130 to close. When relay contact 128 closes electrical connection is completed from line 120 through the motor M, line 121, line 129, contact 128, line 124, and the remote portion of line 121 to the other side of the source of current supply. The motor M will thus start to rotate and, as holding relay contact 130 will be closed as soon as relay coil 126 is energized, the connection of motor M to the source of current will be maintained even after the operator releases the manual switch 27 and it returns to its normal open position under the influence of a spring or the like (not shown).

As will appear later, the cam actuated switch 123 is closed very shortly after the motor M is started upon closing of the manual switch 127, and said switch 123 remains closed until opened by the switch actuating cam 31 at the completion of a taping operation. After the cycle is initiated by closing manual switch 127, if the clutch actuated switch 125 is opened, and the operation of this switch will be explained later, the energizing circuit to the actuating coil 126 of relay S will be broken and contacts 128 and 130 of said relay will open. However, motor M will continue to operate until cam actuated switch 123 is opened.

Having explained the electrical connections which control the operation of motor M and thus control the operation of the entire taping machine, the mechanism for driving the tubular cam shaft 26 to effect the desired rotation of the cams mounted thereon will now be described.

As previously noted, the inner cam drive shaft 24 will be rotated continuously so long as the motor M is operated. This shaft carries at its right-hand end (FIGURE 9) a pinion gear 135 which meshes with a relatively large timer gear 136 rotatably supported on a shaft 137 carried by the clutch housing 138. Also secured to and rotatable with shaft 124 is a drive arm 139 disposed inwardly of gears 135 and 137 and adapted to rotate in the cylindrical bore 140 in the clutch housing 138.

As previously explained, the tubular cam shaft 26 is rotatably supported on the inner drive shaft 24. The clutch end of tubular shaft 26 is supported in a bearing 28 in bracket 29 and has its clutch end adjacent the hub of drive arm 139 which is carried by inner drive shaft 24 (see FIG. 11). Mounted on and rotatable with tubular shaft 26, and disposed within the cylindrical bore 140 in the clutch housing 138, is a clutch dog supporting yoke member 141 having a slot 142 extending radially inwardly from its outer end. A pin 143 (see FIG. 11) is carried by the outer end of yoke member 141 and extends transversely of the slot 142. This pin 143 forms a pivotal support for the clutch dog member 144 which, as seen in FIGURE 11, extends parallel to the axis of shafts 24 and 26 and has a contact face 144′ shaped to conform to the inner surface of cylindrical bore 140 of clutch housing 138 and adapted to contact therewith during simultaneous rotation of shafts 24 and 26 as will later appear.

A compression spring 145 is guided by suitable pins mounted respectively in dog 144 and yoke member 141 and exerts a continuous radial outward pressure against dog 144 tending to swing it outwardly around its pivotal support 143. A radially extending slot 146 (see FIGURES 10 and 11) extends into the clutch housing 138 at the bottom thereof. This slot 146 has a circumferential dimension just slightly larger than the circumferential thickness of the pivoted dog 144.

Figure 11:
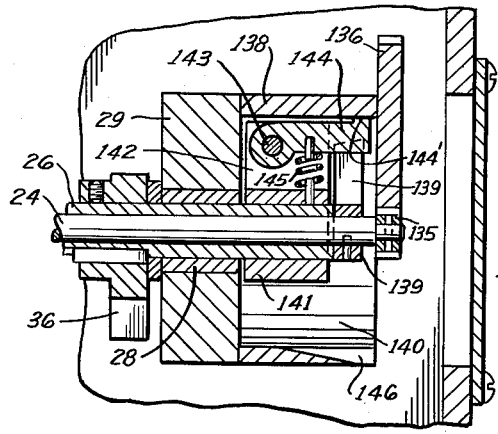
FIGURE 11 is a cross-sectional view further illustrating the clutch mechanism and taken substantially on line 11—11 of FIGURE 10.
Figure 10:
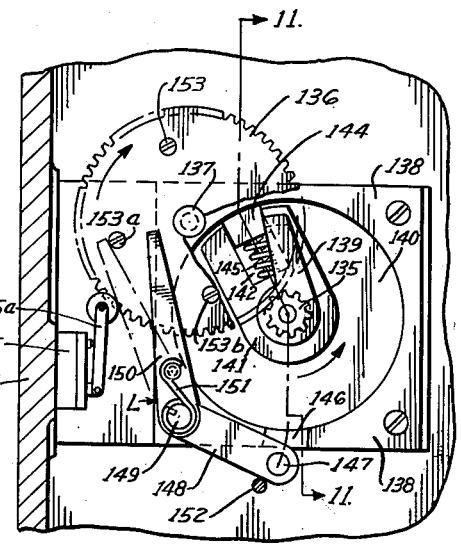
FIGURE 10 is a fragmentary cross-sectional view illustrating the clutch mechanism and taken substantially on line 10—10 of FIGURE 9.

As seen in FIGURES 10 and 11 the contact face 144′ of dog 144 is engaged with the cylindrical surface of bore 140 which holds dog 144 in against the pressure of spring 145 so that dog 144 lies in the path of the outer end portion of drive arm 139 on inner drive shaft 24. Thus, if drive shaft 24 is rotated in counterclockwise direction as indicated by the arrow in FIGURE 10, the end of arm 139 will engage dog 144 which in turn will drive the yoke member 141 and rotate tubular shaft 26 with inner shaft 24. However, if this counterclockwise rotation of shaft 24 is continued until dog 144 overlies the slot or recess 146 in the housing 138, the spring 145 will cause dog 144 to swing radially outwardly into recess 146. As will be referred to later, such outward movement of dog 144 is stopped by its engagement with a pin 147 on the lower arm portion 148 of lever L.

This outward movement of dog 144 into slot 146 is sufficient, however, to permit the outer end of drive arm 139 to clear the inner face of dog 144 and continue its rotation with inner shaft 24. Thus, when dog 144 becomes aligned with slot 146 in the clutch housing, and is moved outwardly thereinto by the spring 145, the tubular shaft 26 will be locked against further rotation while the inner drive shaft 24 may continue freely to rotate. This is the disengaged condition of the clutch C. In order to again engage the clutch C and interlock the shafts 24 and 26 for simultaneous rotation it is necessary that the free end of dog 144 be pushed radially inwardly until it clears the sides of notch 146 and is in the path of, and disposed to be engaged by, the drive arm 139. When such inward movement is imparted to dog 144 it will be picked up by arm 139 and simultaneous rotation of shafts 124 and 126 will again occur.

As previously noted, the outward movement of the free end of dog 144 is limited by a pin 147 on the end of lower arm 148 of clutch actuating lever L. Pin 147 extends parallel to shafts 24 and 26 and lever L is pivotally supported on the clutch housing 138 at 149 and has an upper arm 150 extending in the generally opposite direction from lower arm 148 (see FIGS. 10 and 12). A spring 151 is adapted to urge lever L in clockwise direction as seen in FIGURE 10 so that the outer end of lower arm 148 will normally engage a stop pin 152 in the machine housing.

In the operation of the mechanism just described, keeping in mind that the parts of the mechanism are shown in the drawings in their machine idle or "off" positions, when the manual switch 127 is closed the motor M and the inner drive shaft 24 will immediately start to rotate. This will cause simultaneous rotation of the outer tubular shaft 24 because of the driving engagement between the arm 139 and the dog 144. This simultaneous rotation of shafts 24 and 26 will continue through approximately 155° of rotation in counter-clockwise direction as seen in FIGURE 10 (and also clearly indicated in timing diagram FIGURE 13) whereupon dog 144 becomes aligned with and will move outwardly into slot 146 due to spring 145, stopping tubular shaft 26 but permitting the continuing rotation of inner drive shaft 24. Such independent rotation of inner shaft 24 will continue until dog 144 is pressed inwardly into position to again be picked up by arm 139, whereupon simultaneous rotation of the two shafts 24 and 26 will be resumed.

In the operation of my apparatus, as will appear later, after certain initial manipulations are performed, the tape may be wound in successive overlapping layers on the article. It is the clutch mechanism now being described which controls, and permits variation of, the number of wraps that will be applied before the shut-off operations are effected which cut off the tape and stop the machine. The number of wraps that will be completed before shut-off depends upon the number of rotations of shaft 24 which shaft, by proper gearing design, rotates the same number of rotations as the tape winding ring 3.

To effect inward movement of dog 144 when it lies in slot 146 it is necessary to move the lever L counter-clockwise as seen in FIGURE 10 until the pin 147 engages dog 144 and pushes it into position to be picked up by arm 139. This movement of lever L is effected by engagement of the upper end 150 thereof by one of the group of equally spaced apart actuator pins 153, 153a and 153b, carried by the large gear 136 and extending outwardly toward the end of the housing H. Due to the small size of pinion 135 and the relatively large size of gear 136 a number of revolutions of gear 135 and shaft 24 will be required to give a single revolution of gear 136.

For example, assuming that the ratio between gears 135 and 136 is twelve to one, to effect one full revolution of gear 136 will require that gear 135 rotate twelve revolutions. During such twelve revolutions the tape would be wound twelve wraps around the article being taped as gear 135 and the tape winding ring 3 rotate at the same rate. With four equally spaced actuator pins as is indicated in FIGURE 10, only three of the four pins (153, 153a and 153b) being seen in the drawing because part of gear 136 is broken away to show the clutch mechanism, gear 136 will have to be rotated through 90° of travel before pin 153b will have engaged the upper end 150 of lever L and arrived at the position of pin 153a in FIGURE 10. At this point the lower arm 148 of lever L and pin 147 will have moved dog 144 up into clutch engaged position where it will be driven by arm 139. To effect the referred to 90° rotation of gear 136 will require three full revolutions of gear 135 which will be accompanied by three full revolutions of the tape winding ring 3 and will wind a total of three wraps of tape on the article.

If only three pins 153 are used, equally spaced 120° apart, four wraps will be applied because four complete revolutions of ring 3 and gear 135 will be required to cause the next in order pin 153 to actuate lever L to engage the clutch C and start the final cut-off and machine stopping operations. If only a single pin 153 were mounted on gear 136 twelve wraps would be made before the machine would be shut off. Thus, by using different numbers of equally spaced pins 153 on gear 136, the number of wraps of tape applied to the article may be varied as desired.

With the four pin set-up shown in FIGURE 10, the parts being illustrated in machine idle or "off" position, upon starting the motor M the gear 135 and arm 139 will immediately start to rotate in clockwise direction. Due to the engagement of arm 139 with dog 144, this rotation will also effect rotation of tubular cam shaft 26 by virtue of the mounting of dog 144 in yoke member 141. After approximately 155° of the first revolution the dog 144 will become aligned with slot 146 and will move out into this slot thus disengaging the clutch and stopping rotation of the tubular cam shaft 26 while permitting continuing rotation of the drive shaft 24 and gear 135.

Of course as soon as the motor M was started large gear 136 also started to rotate and the pin 153b will be moved clockwise toward arm 150 of lever L. After the clutch becomes disengaged at 155° of the first revolution of shaft 24, said shaft 24 and gear 135 will continue to rotate and will complete their first revolution when arm 139 again reaches the position seen in FIGURE 10. During the next or second full revolution of shaft 24 and gear 135 the clutch will remain in disengaged position because the pin 153b has not yet been advanced far enough to move pin 147 enough to lift dog 146 up into the path of the arm 139. However, after a part of the third revolution of shaft 24 and gear 135, pin 153b will have moved lever L counter-clockwise in FIGURE 10 sufficiently to cause dog 144 to arrive at its retracted or clutch engaged position at substantially the same time that arm 139 arrives in angular position to pick up dog 144. During the remainder of the third revolution of shaft 24 and gear 135 the clutch will be engaged and dog 144 and tubular cam shaft 26 will rotate with drive shaft 24. As will be later more fully explained, when the third or final revolution is completed and the parts arrive at the positions seen in FIGURE 10, the cam operated switch 123 will be opened stopping the motor M, and the entire machine will stop and be ready for another taping operation. It will be understood that although the number of equally spaced pins 153 employed may be varied to vary the number of wraps of tape that are wound on the article, the mode of operation of the clutch unit C in each case will be substantially as has just been described.

Figure 13:
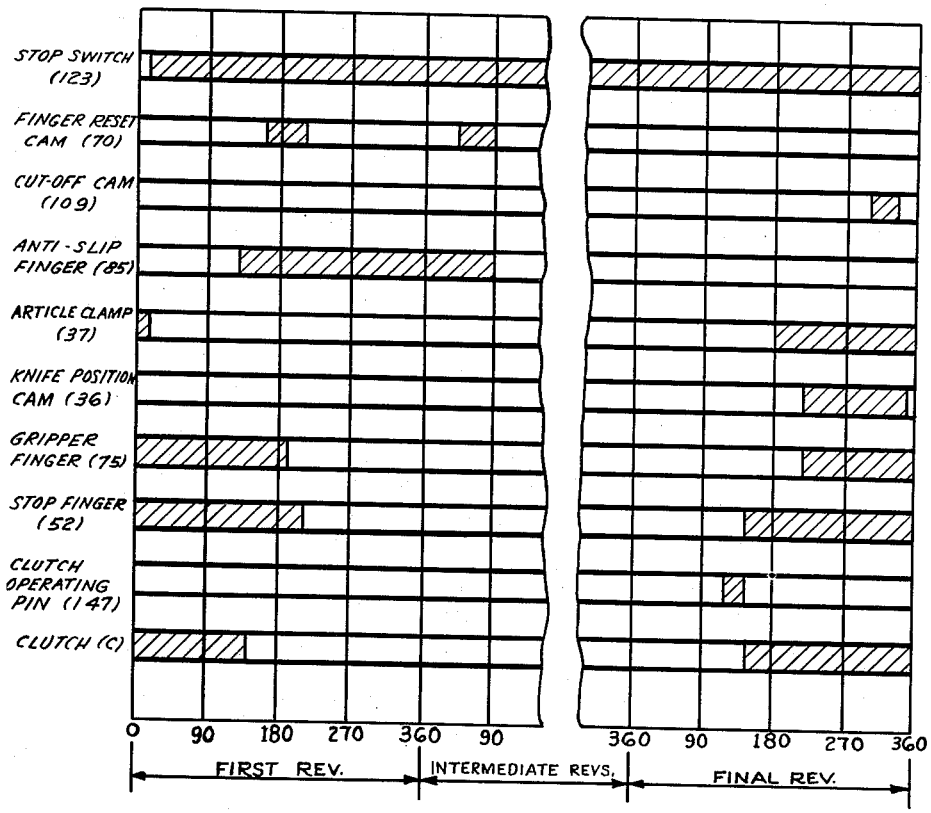
FIGURE 13 is a timing diagram indicating the cycle of operations of a number of the components of my improved taping machine during one complete taping operation.

Before describing a full taping cycle of the illustrated machine it is pointed out that the timing diagram shown in FIGURE 13 represents the various conditions of the several functioning elements of the machine at various points in one complete taping cycle or operation. In the diagram each horizontal line represents the timing program of a particular element of the device, these elements being identified by name at the side of the particular line involved. The diagram is divided horizontally into revolutions, each revolution being divided into degrees in 90° increments as indicated at the bottom. The "first revolution" of the winding ring 3 is shown in full 360°, then the first portion (about 180°) of the first of a variable number of "intermediate revolutions" is indicated followed by a break and then about the last 90° of the last of the intermediate revolutions. Next the "final revolution" of the ring 3 is shown in full 360°.

To enable the diagram to be clearly understood it is explained that the first or top line indicates the timed operation of the machine stop switch 123 and its cam 31, the switch being open in the blank part of the chart and being closed during the cross-hatched portion. The second line represents the action of the finger reset cam 70, the left-hand cross-hatched portion indicating the portion of the cycle during which this cam is swinging gripper finger 75 and stop finger 52 out of their extended positions and the right-hand cross-hatched portion indicating that part of the cycle during which the finger reset cam 70 acts to retract the anti-slip finger 85. The third line represents the action of the cut-off cam 109, the cross-hatched portion indicating the part of the final revolution during which this cam moves the knife K in its cut-off operation. Line 4 shows the action of the anti-slip finger 85 and its actuating cam 35, the blank portions representing the time the finger 85 is retracted and the cross-hatched portion indicating the time the finger is in gripping position and moving to and from this position. Line 5 shows the operation of the article clamp 37 and its cam 32, the article unclamped or open position being seen in the cross-hatched position and the article clamped position being indicated by the blank portion. Line 6 shows the action of the knife positioning cam 36 in retracting and extending the knife support shaft 93 and knife K and its associated parts; during the blank portion the knife and its supporting parts are retracted as seen in full lines in FIGURE 6 while during the cross-hatched portion they are being moved into or out of extended position or are in this position. Line 7 illustrates the action of the gripper finger 75 and its cam 34, the cross-hatched portions illustrating the extended gripping position and the blank portion representing the retracted position. Line 8 represents the stop finger 52 and its cam 33, the cross-hatched position indicating the extended or tape engaging condition and the blank portion indicating that the finger 52 is retracted into the recess 39. Line 9 shows the cycle of operation of the clutch operating pin 147, the cross-hatched portion showing the point in the cycle during which the pin 147 causes the clutch C to reengage by lifting the dog 144. Line 10 illustrates the positions of the clutch C during a full cycle, the cross-hatched portions indicating the engaged condition of the clutch during which both the shaft 24 and the shaft 26 and the cams thereon are rotating while the blank portion indicates that the clutch C is disengaged and shaft 24 and the cams thereon are stationary.

Keeping in mind that the parts of my taping machine, as seen in the drawings, are in their idle or "off" positions, and referring to the timing diagram of FIGURE 13 and to the other views of the drawings, an operation cycle of my machine will be described.

When the manual start switch 127 is closed the motor M starts to rotate driving the tape winding ring 3 which carries the roll of tape R and simultaneously driving the inner drive shaft 24 which extends to the clutch C. As seen in the timing diagram FIGURE 13, and in FIGURE 10, the clutch C is engaged at the start of an operation and remains engaged and thus drives the tubular shaft 26 and the several cams carried thereon during the first 155° of rotation of the ring 3. At that time the clutch dog 144 moves out into the slot 146 thus stopping the movement of the shaft 26 and the cams carried thereby. However, as switch 123 is closed, the motor M will continue to rotate driving the taping ring 3 and the shaft 24 which rotates at the same speed. This rotation will continue until one of the pins 153 on gear 136 moves lever L into position to cause the pin 147 to lift dog 144 out of slot 146 into position where it may be picked up by arm 139. When such pick-up is effected rotation of shaft 26 and its cams is resumed.

As seen in timing diagram FIGURE 13, the first revolution of ring 3 during a taping cycle involves certain predetermined operations as does also the final revolution. However, in between the first and final revolutions a number of intermediate revolutions, one or more depending on the number of pins 53 employed, will occur. This variable number of intermediate revolutions is indicated in FIGURE 13 by the vertical break in the chart. It will also be noted that certain operations occur during the first part of the first intermediate revolution, it being understood that there is always at least one intermediate revolution and that thus there will always be at least three wraps applied during a taping operation.

As seen in FIGURE 13, the clutch C is disengaged during all of the intermediate revolutions and during the first 155° of the final revolution, at which point lever L has been moved by the next pin 153 to cause engagement of the clutch C and rotation of the hollow shaft 26 and the cams thereon. At approximately the same time that clutch C is reengaged during the final revolution, the upper arm 150 of lever L will have engaged switch operating arm 125a (see FIGURE 10) of the clutch actuated switch 125 and will move same into open position. As previously explained this will deenergize the coil 126 of relay S and cause contacts 128 and 130 to open. The actuating pin 153 then moves on beyond arm 150 and the lever L returns to its idle position as seen in FIGURE 10 and switch 125 will again be closed. As switch 123 remains closed the motor M will continue to operate and taping ring 3, shaft 24, shaft 26 and the cams thereon will all continue to rotate. This rotation continues to the end of the "final revolution" at which point the switch cam 31 arrives at its off position, seen in FIGURES 12 and 15, permitting the operating arm 123a (see FIG. 12) of switch 123 to move into recess 31a in the cam 31 thus opening switch 123 and breaking the circuit to the motor M. This stops motor M and terminates the taping cycle and the parts will now be in position for another taping cycle upon actuation of the manual switch 127.

The above description explains how the taping cycle is started and then automatically stopped. The operation of the clamping member, tape control fingers, cut-off knife, and the timing thereof in the cycle will now be described, again referring to timing diagram FIGURE 13 and the other views of the drawings.

In FIGURE 13 the top line illustrates the operation of the cam actuated switch 123, the shaded portion representing the switch closed condition and the unshaded portion at the beginning of the first revolution representing the only part of the cycle during which the switch is open as previously explained, line 5 of the diagram of FIGURE 13 shows when the article clamp 37 is in work clamping position and work released position. The shaded portions of the diagram represent the released or unclamped condition while the blank portion represents the clamped condition. Thus the clamp actuating cam 32 (FIG. 16) is so contoured that shortly after the start of the first revolution the then retracted or released clamp 37 will be swung around its pivotal support 38 by the spring 48 (FIG. 12) into spring pressed engagement with article A which is to be taped. This clamping action will be maintained until, at approximately 180° in the final revolution, the cam 32, acting on the follower roller 51, will move arm 37 back into released or unclamped position to permit the taped article to be withdrawn. As clamp 37 remains retracted until after the start of the next taping operation a new article A may be inserted in slot 1 without interference.

Just before the start of a taping operation the free end of tape T extends about half way around the stop finger 52 and is clamped thereagainst by the gripper finger 75. When the ring 3 starts to rotate, as will be apparent from FIGURE 1, the end of tape T will be held between fingers 52 and 75 and the length of tape between winding pin 11 and finger 52 will start to wind around the article A which is to be taped. As will be seen from the timing diagram FIGURE 13, at the start of a taping cycle the stop finger 52 and the gripper finger 75 are in their extended or operating positions as is represented by the shaded parts on the diagram. As is also seen from FIGURE 13, at the start of a cycle the anti-slip finger 85 is in its retracted or withdrawn position (perhaps best seen in FIG. 2) out of the path of the tape as it moves around the article A.

After ring 3 has rotated through about 150° of the first revolution, the cam 35 (FIG. 19) will swing operating arm 89 to push arm 86 outwardly in the guide slots in bushing 88 until it clears the end thereof whereupon the torsion spring 92 (which corresponds to spring 68 seen in FIG. 2) will immediately swing arm 86 and finger 85 in counter-clockwise direction as seen in FIGURE 1 until anti-slip finger 85 rests on the tape which has been wound over article A and will hold same against article A. Of course, this movement of finger 85 into gripping position does not occur until after the tape T has gone past the retracted position of finger 85. Furthermore the outward movement of arm 86 and finger 85 does not occur until after the finger reset cam 70 has moved beyond the lower end of arm 86.

Thus, when the cam shaft 26 stops rotating at 155° of the first revolution the article A is gripped by gripper 37, the tape is held against the article by the anti-slip finger 85, and the stop finger 52 and gripper finger 75 still remain in their extended tape holding positions. Continued movement of ring 3 during the first revolution will cause the inner end portion of re-set cam 70 to engage the end 83 of arm 76 which carries the gripper finger 75 and swing same clockwise as seen in FIGURE 1 until arm 76 becomes aligned with the slots in its supporting bushing 78 permitting the spring 82 to swing arm 80 and withdraw gripper finger 75 back into the recess 39 at the housing 8 out of the path of the tape. Reset cam 70 next strikes end 71 of arm 53, swinging stop finger 52 clockwise as seen in FIGURE 1 until its arm 53 aligns with the slots 57 and 58 in the bushing 55 and is retracted by the action of spring 72 on arm 64 (see FIG. 2). This action of the finger reset cam 70 is indicated by the shaded portion of line 2 of the timing diagram (FIG. 13) that extends from approximately 170° to 205° of the first revolution.

Inasmuch as the stop finger 52 and gripper finger 75 have now been withdrawn, the free end of the tape T will project from the article A and, as a complete wind of tape has not yet been effected, the anti-slip finger 85 functions to hold the tape against the article A and prevent slipping thereon due to the winding tension. Thus the function of the anti-slip finger 85 is temporarily to hold the tape against slip on the article A during a portion of the first revolution, before one full wind of tape is applied but after the stop finger 52 and gripper finger 75 have been retracted.

It is, of course, necessary to retract or withdraw anti-slip finger 85 before the tape reaches it during the first part of the "first intermediate" revolution of ring 3 in the winding operation. This retraction is effected by engagement of the finger re-set cam 70 with the end 86a of arm 86 which, as indicated in the second line of timing diagram FIGURE 13, occurs at approximately 45° in the "first intermediate" revolution, retraction of anti-slip finger 85 being completed by 90° of the first intermediate revolution.

As the projecting fingers 52, 75 and 85 have now all been withdrawn out of the path of the tape T, and as slightly more than one full lap or wind of tape has been applied and the tape has sufficient adherence to the article A and to itself to provide the necessary tension to unwind the tape from the roll R, the intermediate revolutions which apply the desired and pre-determined laps of tape may now be completed. As previously explained the number of laps wound on the article is determined by the number of pins 153. One of these pins will swing the lever L during the initial part of the "final" revolution to move the clutch operating pin 147 upwardly, as is indicated by the shaded portion of line 9 of the timing diagram FIGURE 13, so that the clutch dog 144 is picked up by arm 139 and the clutch engaged at approximately 155° in the final revolution. When the clutch becomes engaged at this point the cam shaft 26 again starts to rotate carrying with it the several cams. Stop finger cam 34 immediately starts to move stop finger 52 out into its extending or operating position and completes this movement at about 215° of the final revolution. The stop finger 52 now lies ahead of but in the path of the tape T and the tape T is wound over the outer face of finger 52 as the ring 3 rotates. Immediately after the tape T has engaged stop finger 52 the gripper finger cam 34 acts to move gripper finger 75 into tape gripping position and this operation is completed at about 295° of the final revolution, whereupon pin members 52 and 75 are in the positions seen in FIGURE 1 with the tape gripped firmly therebetween. As clearly seen in FIGURE 13, this gripping position is held until release and retraction during the first revolution of the next taping operation.

The tape now extends generally vertically downwardly from the article A to the stop pin 52. While thus held it is cut off by the knife K which, up until the time the tape has reached the extended stop finger 52 in the final revolution, has been in its withdrawn position as seen in FIGURE 6. The knife cam 36 (FIG. 20) is so contoured that at approximately 250° of the final revolution it will move arm 98 due to its engagement with roller 100, with consequent outward movement of shaft 93. At approximately 295° in the final revolution the shaft 93 and the knife K will have been moved from their retracted positions into their extended or operative positions seen in phantom lines in FIGURE 6.

The cut-off cam 109 which is carried on the ring 3 is so positioned, and its cam face 110 is so positioned and contoured, that at approximately 300° of the final revolution the cam face 110 will engage the roller 111 and cause the knife K to move to the left as seen in FIGURES 7 and 8 against the spring 107 until the pointed blade portion 112 has pierced and severed the tape T, cutting it off from the rest of the roll. The movement of the knife K to the left as seen in FIGURE 1 is continued so that the inclined or tapered face 113 on the knife body will iron the severed end of the tape down against the previously applied tape on the article A, thus completing a neat and finished taping operation. After the radially inward cut-off movement of knife K is completed at approximately 340° of the final revolution of ring 3, the cam 109 clears the roller 111 permitting the spring 107 to return knife K to the position seen in phantom lines in FIGURE 6. The operation of cam 109 is indicated in line 3 of the timing diagram FIGURE 13, the shaded portion representing the time during which this cam engages and moves the knife K in the cutting direction. The relation of cut-off cam 109 to positioning cam 36 is seen by line 6 of the timing diagram, cam 36 being contoured to move the knife K completely out into operating position at about 295° of the final revolution as previously explained and to permit retraction of the knife back into the full line position of FIGURE 6 at approximately 350° of the final revolution.

The clutch C remains engaged at the completion of 360° of the final revolution. At this time the stop finger 52 and the gripper finger 75 will be extended and will hold the cut-off end of the tape T therebetween. The knife K has just been retracted into the position seen in full lines of FIGURE 6. The article clamp 37 has been released and completely withdrawn out of the slot 1 and the switch cam 31 has just permitted the switch 123 to open. If another article A is now inserted in slot 1 and switch 127 is again momentarily closed, the above described complete taping cycle will automatically be repeated and the tape cut off and the free end ironed down against the article to be taped. By varying the number of pins 153 and the ratio between gears 135 and 136 the machine may be set so that the desired number of wraps of tape will be applied. It will also be understood that a number of my machines may be installed side by side with suitable spacing therebetween so that a plurality of taping operations may simultaneously be performed at spaced points along the length of an elongated article, such as a bundle of wires, which has been placed into the slots 1 of the several machines. Also, by effecting relative lengthwise movement of the article being taped, the tape may be applied in spiral overlapping arrangement along a pre-determined length of the article.

Although I have illustrated and described in considerable detail one embodiment of my invention it will be understood that variations and modifications may be made in the specific mechanisms employed to carry out the various functions of the several elements of my device. Accordingly I do not wish to be limited to the particular apparatus herein illustrated and described but claim as my invention all embodiments thereof coming within the scope of the appended claims.

I claim:

1. A taping machine including a frame structure, a split tape winding ring having a slot therein and rotatably supported on said frame structure, tape carrying means on said winding ring adapted to carry a supply of tape, means for driving said winding ring whereby continuous rotation of said ring will occur during a taping operation, a retractable tape engaging finger having an extended position in which said finger extends across the winding path of said tape and a retracted position in which said finger is withdrawn out of said winding path of the tape, and means for effecting advancement and retraction of said finger at pre-determined points in a taping operation.

2. A taping machine including a frame structure, a split tape winding ring having a slot therein and rotatably supported on said frame structure, tape carrying means on said winding ring adapted to carry a supply of tape, means for driving said winding ring whereby continuous rotation of said ring will occur during a taping operation, a retractable tape engaging finger having an extended position in which said finger extends across the winding path of said tape and a retracted position in which said finger is withdrawn out of said winding path of the tape, a retractable knife having a cutting-off position in which said knife is disposed in said winding path of the tape and a retracted position in which said knife is withdrawn out of said winding path of the tape, means for effecting advancement and retraction of said finger at pre-determined points in a taping operation, and means for effecting advancement and retraction of said knife, independently of advancement and retraction of said finger, at pre-determined points in a taping operation.

3. A taping machine including a frame structure, a split tape winding ring having a slot therein and rotatably supported on said frame structure, tape carrying means on said winding ring adapted to carry a supply of tape, means for driving said winding ring whereby continuous rotation of said ring will occur during a taping operation, a retractable tape engaging finger having an extended position in which said finger extends across the winding path of said tape and a retracted position in which said finger is withdrawn out of said winding path of the tape, a pivotally mounted support arm for said finger, means actuated by said means for driving said winding ring, for moving said support arm and finger in finger extending direction, means for moving said support arm and finger in finger retracting direction, means tending to pivotally move said support arm in one direction, said last named means being adapted to effect such pivotal movement of said support arm only after said finger has been moved into the winding path of the tape, stop means for limiting such pivotal movement of said arm, and means for pivotally moving said support arm in the opposite direction whereby said means for moving said support arm in finger retracting direction may effect such retracting movement of said arm and finger.

4. A taping machine including a frame structure, a split tape winding ring having a slot therein and rotatably supported on said frame structure, tape carrying means on said winding ring adapted to carry a supply of tape, means for driving said winding ring whereby continuous rotation of said ring will occur during a taping operation, a retractable tape engaging finger having an extended position in which said finger extends across the winding path of said tape and a retracted position in which said finger is withdrawn out of said winding path of the tape, a support arm for said finger, a shaft on one end of which said support arm is carried, a split bushing carried by said frame structure, said shaft extending through said split bushing and having rotary and axial movement relative thereto, cam means, actuated by said means for driving said winding ring, for moving said shaft axially in said bushing in finger extending direction, spring means for moving said shaft axially in said bushing in finger retracting direction, shaft rotating spring means tending to rotate said shaft in said bushing in one direction, said bushing having a slot extending inwardly from one end and said support arm being disposed in said slot when said finger is in said retracted position, said shaft rotating spring means being adapted to effect rotation of said shaft and support arm after said shaft has been moved axially in said bushing by said cam means until said arm clears said slot in said bushing and said finger has been moved into the winding path of the tape, stop means for limiting said rotation of said arm when it is clear of said slot, and means carried by said winding ring for rotating said arm in the opposite direction against said spring means until said arm becomes aligned with said slot whereupon said spring means for moving said shaft axially in said opposite direction will effect such movement of said shaft, arm and finger.

5. A taping machine, having an "off" position at which the machine stops on completion of a taping operation, comprising a frame structure, a split tape winding ring having a slot therein and rotatably supported on said frame structure, tape carrying means on said winding ring, driving means for said winding ring whereby continuous rotation of said ring will occur during a taping operation, a plurality of tape engaging and controlling fingers and a tape cut-off knife all supported for movement between retracted and operating positions, a drive shaft rotatable by said driving means with said winding ring, a cam shaft, cam means on said cam shaft adapted to control movement of said fingers and knife into their operating positions, clutch means between said drive shaft and said cam shaft, said clutch means being in engaged position to connect said shafts when said machine is in said "off" position, means for effecting disengagement of said clutch means after the machine is started, means for effecting reengagement of said clutch after a predetermined number of revolutions subsequent to said disengagement, and means for stopping said driving means after said reengagement of said clutch.

6. A taping machine having an "off" position at which the machine stops on completion of a taping operation, comprising a frame structure, a split tape winding ring having a slot therein and rotatably supported on said frame structure, tape carrying means on said winding ring adapted to carry a supply of tape, driving means for said winding ring whereby continuous rotation of said ring will occur during a taping operation, an article clamp member, a plurality of tape engaging and controlling fingers, and a tape cut-off knife all supported for movement between retracted and operating positions, a drive shaft rotatable with said winding ring by said driving means, a cam shaft, cam means on said cam shaft adapted to control movement of said clamp member, fingers and knife into their operating positions, clutch means between said drive shaft and said cam shaft, said clutch means being in engaged position to connect said shafts when said machine is in said "off" position, means for effecting disengagement of said clutch means during the first revolution of said drive shaft after the machine is started, means, actuated by said drive shaft, for effecting reengagement of said clutch after a predetermined number of revolutions subsequent to said disengagement, and means for stopping said driving means during the revolution of said drive shaft following reengagement of said clutch.

7. In a taping machine of the type described, a frame structure, a split tape winding ring rotatably supported on said frame structure, a driving motor for said winding ring, driving connections between said motor and said driving means whereby said ring is rotated at all times during operation of said motor, a tape engaging finger, a tape cut-off knife, a drive shaft connected to said motor to rotate with and at the same speed as said winding ring, a cam shaft having cam means thereon adapted to control in timed sequence the operations of said tape engaging finger and said cut-off knife, said cam shaft being tubular and supported concentrically with said drive shaft, clutch means adapted when engaged to effect driving connection between said drive shaft and said cam shaft and when disengaged to disconnect said shafts, means for disengaging said clutch means at a predetermined point in the rotation of said cam shaft, means for effecting engagement of said clutch, and means for actuating said means for effecting engagement of said clutch to effect engagement of said clutch at a predetermined time after disengagement thereof by said means for disengaging said clutch.

8. In a taping machine of the type described, a frame structure, a split tape winding ring rotatably supported on said frame structure, a driving motor for said winding ring, driving connections between said motor and said driving means whereby said ring is rotated at all times during operation of said motor, a tape engaging finger, a tape cut-off knife, a drive shaft, driving connections between said drive shaft and said motor, a cam shaft having cam means thereon adapted to control in timed sequence the operations of said tape engaging finger and cut-off knife, a clutch housing having a cylindrical bore into which the ends of said drive shaft and said cam shaft extend, a clutch dog supporting yoke member secured to said cam shaft and disposed for rotation in said bore in said clutch housing, a clutch dog member pivotally supported at the outer end of said yoke member within said bore in said clutch housing, means for urging said dog member radially outwardly of said clutch housing bore, a drive arm secured to said drive shaft and adapted to engage said clutch dog member when said dog member lies within said bore whereby, during rotation of said drive shaft, said cam shaft will be simultaneously rotated, said clutch housing having a recess extending radially outwardly from said bore therein, said recess being adapted to receive said clutch dog member when said dog member becomes aligned with said recess, and means for moving said clutch dog member radially inwardly out of said recess into said clutch housing bore whereby said dog member may be picked up by said drive arm and the clutch reengaged.

9. In a taping machine of the type described, a frame structure, a split tape winding ring rotatably supported on said frame structure, a driving motor for said winding ring, driving connections between said motor and said driving means whereby said ring is rotated at all times during operation of said motor, a tape engaging finger, a tape cut-off knife, a drive shaft connected to said motor to rotate with and at the same speed as said winding ring, a cam shaft having a plurality of actuating cams thereon adapted to control in timed sequence the operations of said tape engaging finger and cut-off knife, said cam shaft being tubular and supported concentrically with said drive shaft for rotation relative thereto, a clutch housing supported on said frame and having a cylindrical bore into which the ends of said drive shaft and said cam shaft extend, a clutch dog supporting yoke member secured to said cam shaft and disposed for rotation in said bore in said clutch housing, a clutch dog member pivotally supported at the outer end of said yoke member and extending parallel to the axes of said drive and cam shafts within said bore in said clutch housing, spring means for urging said dog member radially outwardly of said clutch housing bore, a drive arm secured to said drive shaft and extending radially in said clutch housing bore and adapted to engage said clutch dog member when said dog member lies within said bore whereby, during rotation of said drive shaft, said cam shaft will be simultaneously rotated, said clutch housing having a recess extending radially outwardly from the surface of said bore therein, said recess being adapted to receive said clutch dog member under the influence of said spring means when said dog member becomes aligned with said recess, means for moving said clutch dog member radially inwardly out of said recess into said clutch housing bore whereby said dog member may be picked up by said drive arm and the clutch reengaged, and means for actuating said clutch dog member moving means to effect reengagement of said clutch at a predetermined time after disengagement thereof by movement of said clutch dog member out into said recess in said clutch housing.

10. In a taping machine of the type described, a frame structure, a split tape winding ring rotatably supported on said frame structure, a driving motor for said winding ring, driving connections between said motor and said driving means whereby said ring is rotated at all times during operation of said motor, a tape engaging finger, a tape cut-off knife, a drive shaft, driving connections between said drive shaft and said motor, a cam shaft having cam means thereon adapted to control in timed sequence the operations of said tape engaging finger and cut-off knife, a clutch housing having a cylindrical bore into which the ends of said drive shaft and said cam shaft extend, a clutch dog supporting yoke member secured to said cam shaft and disposed for rotation in said bore in said clutch housing, a clutch dog member povitally supported at the outer end of said yoke member within said bore in said clutch housing, means for urging said dog member radially outwardly of said clutch housing bore, a drive arm secured to said drive shaft and adapted to engage said clutch dog member when said dog member lies within said bore whereby, during rotation of said drive shaft, said cam shaft will be simultaneously rotated, said clutch housing having a recess extending radially outwardly from said bore therein, said recess being adapted to receive said clutch dog member when said dog member becomes aligned with said recess, a pivotally supported clutch control lever, means on said lever adapted to engage said clutch dog member when in said recess in said clutch housing and move same radially inwardly into clutch engaged position, a gear on said drive shaft, a meshing gear of greater diameter than said gear on said drive shaft and supported for rotation therewith, and a plurality of equally spaced projections on said meshing gear disposed to engage said lever and move same to effect reengagement of said clutch after a predetermined number of revolutions of said drive shaft subsequent to the initial movement thereof in a taping operation.

11. In a taping machine of the type described, a frame structure, a split tape winding ring rotatably supported on said frame structure, a driving motor for said winding ring, driving connections between said motor and said driving means whereby said ring is rotated at all times during operation of said motor, a tape engaging finger, a tape cut-off knife, a drive shaft connected to said motor to rotate with and at the same speed as said winding ring, a cam shaft having a plurality of actuating cams thereon adapted to control in timed sequence the operations of said tape engaging finger and cut-off knife, said cam shaft being tubular and supported concentrically with said drive shaft for rotation relative thereto, a clutch housing supported on said frame and having a cylindrical bore into which the ends of said drive shaft and said cam shaft extend, a clutch dog supporting yoke member secured to said cam shaft and disposed for rotation in said bore in said clutch housing, a clutch dog member pivotally supported at the outer end of said yoke member and extending parallel to the axes of said drive and cam shafts within said bore in said clutch housing, spring means for urging said dog member radially outwardly of said clutch housing bore, a drive arm secured to said drive shaft and extending radially in said clutch housing bore and adapted to engage said clutch dog member when said dog member lies within said bore whereby, during rotation of said drive shaft, said cam shaft will be simultaneously rotated, said clutch housing having a recess extending radially outwardly from the surface of said bore therein, said recess being adapted to receive said clutch dog member under the influence of said spring means when said dog member becomes aligned with said recess, a pivotally supported clutch control lever, means on said lever adapted to engage said clutch dog member when in said recess in said clutch housing and move same radially inwardly into clutch engaged position, a gear on said drive shaft, a meshing gear of greater diameter than said gear on said drive shaft and supported for rotation therewith, and a plurality of equally spaced projections on said meshing gear disposed to engage said lever and to move same to effect reengagement of said clutch after a predetermined number of revolutions of said drive shaft subsequent to the initial movement thereof in a taping operation.

12. A taping machine, having an "off" position at which the machine stops on completion of a taping operation, comprising a frame structure, a split tape winding ring having a slot therein and rotatably supported on said frame structure, tape carrying means on said winding ring adapted to carry a supply of tape, a driving motor, driving means between said motor and said winding ring whereby continuous rotation of said ring will occur during a taping operation, said frame structure having an article receiving slot extending substantially to the center of rotation of said driving ring and adapted, when the machine is in said "off" position with the slot in said ring and the slot in said frame aligned, to receive an article to be taped, a retractable stop finger supported on said frame structure and disposed in the winding path of the tape when the machine is in said "off" position, a retractable gripper finger supported on said frame structure and adapted to coact with said stop finger and grip the end of the tape therebetween when the machine is in said "off" position, a retractable anti-slip finger supported on said frame structure and disposed out of the winding path of the tape when the machine is in said "off" position, means actuated by said motor for moving said anti-slip finger, during the first revolution of said tape winding ring in a taping operation, into position in the winding path of the tape and holding said tape against the article to be taped, means, including a finger retracting cam on said tape winding ring, for successively retracting out of the winding path of said tape during the first revolution of said tape winding ring in a taping operation said gripper finger and said stop finger, and then, during the second revolution of said tape winding ring, retracting said anti-slip finger out of the winding path of said tape, means actuated by said motor for moving said stop finger into tape engaging position during the final revolution of said tape winding ring in a taping operation, means actuated by said motor for moving said gripper finger into gripping engagement with the tape after the tape engages said stop finger during the final revolution of said tape winding ring in a taping operation, knife means for cutting off said tape at the end of a winding operation, knife supporting means supported on said frame structure and disposed to hold said knife means out of the winding path of said tape when the machine is in said "off" position, means actuated by said motor for moving said knife support means and said knife means, during the final revolution of said winding ring during a taping operation, into cutting position in the winding path of said tape, cut-off cam means on said tape winding ring disposed to engage said knife means when in said cutting position during said final revolution of said tape winding ring and to move said knife means radially of said winding ring to cut off said tape, means for withdrawing said knife means after the tape is cut off and during said final revolution of said winding ring, means for retracting said knife support means and said withdrawn knife means out of the winding path of said tape after said tape is cut off during the final revolution of a taping operation, clutch means for permitting a predetermined number of intermediate revolutions of said tape winding ring between said first and final revolutions thereof in a taping operation while said anti-slip finger, stop finger, gripper finger, and knife means are in their retracted positions, a control circuit for said motor, a stop switch for said motor in said control circuit, and means for actuating said switch to stop said motor on completion of said final revolution of said winding ring whereby the machine will stop in said "off" position and be ready for another taping operation.

13. A taping machine, having an "off" position at which the machine stops on completion of a taping operation, comprising a frame structure, a split tape winding ring having a slot therein and rotatably supported on said frame structure, tape carrying means on said winding ring adapted to carry a supply of tape, a driving motor, driving means between said motor and said winding ring whereby continuous rotation of said ring will occur during a taping operation, said frame structure having an article receiving slot extending substantially to the center of rotation of said driving ring and adapted, when the machine is in said "off" position with the slot in said ring and the slot in said frame aligned, to receive an article to be taped, a retractable stop finger supported on said frame structure and disposed in the winding path of the tape when the machine is in said "off" position, a retractable gripper finger supported on said frame structure and adapted to coact with said stop finger and grip the end of the tape therebetween when the machine is in said "off" position, a retractable anti-slip finger supported on said frame structure and disposed out of the winding path of the tape when the machine is in said "off" position, means actuated by said motor for moving said anti-slip finger, during the first revolution of said tape winding ring in a taping operation, into position in the winding path of the tape and holding said tape against the article to be taped, means, including a finger retracting cam on said tape winding ring, for successively retracting out of the winding path of said tape during the first revolution of said tape winding ring in a taping operation said gripper finger and said stop finger, and then, during the second revolution of said tape winding ring, retracting said anti-slip finger out of the winding path of said tape, means actuated by said motor for moving said stop finger into tape engaging position during the final revolution of said tape winding ring in a taping operation, means actuated by said motor for moving said gripper finger into gripping engagement with the tape after the tape engages said stop finger during the final revolution of said tape winding ring in a taping operation, knife means for cutting off said tape at the end of a winding operation, knife supporting means supported on said frame structure and disposed to hold said knife means out of the winding path of said tape when the machine is in said "off" position, means actuated by said motor for moving said knife support means and said knife means, during the final revolution of said winding ring during a taping operation, into cutting position in the winding path of said tape, cut-off cam means on said tape winding ring disposed to engage said knife means when in said cutting position during said final revolution of said tape winding ring and to move said knife means radially of said winding ring to cut off said tape, means for withdrawing said knife means after the tape is cut off and during said final revolution of said winding ring, means for retracting said knife support means and said withdrawn knife means out of the winding path of said tape after said tape is cut off during the final revolution of a taping operation, a stop switch for said motor, and means for actuating said switch to stop said motor on completin of said final revolution of said winding ring whereby the machine will stop in said "off" position and be ready for another taping operation.

14. A taping machine, having an "off" position at which the machine stops on completion of a taping operation, comprising a frame structure, a split tape winding ring having a slot therein and rotatably supported on said frame structure, tape carrying means on said winding ring adapted to carry a supply of tape, means for driving said winding ring whereby continuous rotation of said ring will occur during a taping operation, said frame structure having an article receiving slot extending substantially to the center of rotation of said driving ring and adapted, when the machine is in said "off" position with the slot in said ring and the slot in said frame aligned, to receive an article to be taped, a retractable stop finger supported on said frame structure and disposed in the winding path of the tape when the machine is in said "off" position, a retractable gripper finger supported on said frame structure and adapted to coact with said stop finger and grip the end of the tape therebetween when the machine is in said "off" position, a retractable anti-slip finger supported on said frame structure and disposed out of the winding path of the tape when the machine is in said "off" position, knife means for cutting off said tape at the end of a winding operation, knife supporting means supported on said frame structure and disposed to hold said knife means out of the winding path of said tape when the machine is in said "off" position, means for moving said anti-slip finger, stop finger, gripper finger and knife means into and out of the winding path of the tape at predetermined times in a taping operation whereby the tape will be held, guided, wound and cut-off during such operation, and means for stopping the machine on completion of the final revolution of said winding ring whereby the machine will stop in said "off" position and be ready for another taping operation.

15. A taping machine, having an "off" position at which the machine stops on completion of a taping operation, comprising a frame structure, a split tape winding ring having a slot therein and rotatably supported on said frame structure, tape carrying means on said winding ring adapted to carry a supply of tape, a driving motor, driving means between said motor and said winding ring whereby continuous rotation of said ring will occur during a taping operation, said frame structure having an article receiving slot extending substantially to the center of rotation of said driving ring and adapted, when the machine is in said "off" position with the slot in said ring and the slot in said frame aligned, to receive an article to be taped, a retractable stop finger supported on said frame structure and disposed in the winding path of the tape when the machine is in said "off" position, a retractable gripper finger supported on said frame structure and adapted to coact with said stop finger and grip the end of the tape therebetween when the machine is in said "off" position, means, including a finger retracting cam on said tape winding ring, for successively retracting out of the winding path of said tape during the first revolution of said tape winding ring in a taping operation said gripper finger and then said stop finger, means actuated by said motor for moving said stop finger into tape engaging position during the final revolution of said tape winding ring in a tape operation, means actuated by said motor for moving said gripper finger into gripping engagement with the tape after the tape engages said stop finger during the final revolution of said tape winding ring in a taping operation, knife means for cutting off said tape after completion of a winding operation, knife support means carried by said frame structure and disposed to hold said knife means out of the winding path of said tape when the machine is in said "off" position, means actuated by said motor for moving said knife support means and said knife means, during the final revolution of a taping operation, into cutting position in the winding path of said tape, cut-off means on said tape winding ring disposed to engage said knife means when in said cutting position during said final revolution of said tape winding ring and to move said knife means radially of said winding ring to cut off said tape, means for withdrawing said knife means after the tape is cut off and during said final revolution of said winding ring, means for retracting said knife support means and said knife means out of the winding path of said tape after said tape is cut off during the final revolution of a taping operation, and mean for permitting a predetermined number of intermediate revolutions of said tape winding ring between said first and final revolutions thereof in a taping operation while said stop finger, gripper finger, and knife means are in their retracted positions.

16. A taping machine, having an "off" position at which the machine stops on completion of a taping operation, comprising a frame structure, a split tape winding ring having a slot therein and rotatably supported on said frame structure, tape carrying means on said winding ring adapted to carry a supply of tape, a driving motor, driving means between said motor and said winding ring whereby continuous rotation of said ring will occur during a taping operation, said frame structure having an article receiving slot extending substantially to the center of rotation of said driving ring and adapted, when the machine is in said "off" position with the slot in said ring and the slot in said frame aligned, to receive an article to be taped, a retractable stop finger supported on said frame structure and disposed in the winding path of the tape when the machine is in said "off" position, a retractable gripper finger supported on said frame structure and adapted to coact with said stop finger and grip the end of the tape therebetween when the machine is in said "off" position, means, including a finger retracting cam on said tape winding ring, for successively retracting out of the winding path of said tape during the first revolution of said tape winding ring in a taping operation said gripper finger and then said stop finger, means actuated by said motor for moving said stop finger into tape engaging position during the final revoluton of said tape winding ring in a taping operation, means actuated by said motor for moving said gripper finger into gripping engagement with the tape after the tape engages said stop finger during the final revolution of said tape winding ring in a taping operation, knife means for cutting off said tape after completion of a winding operation, knife support means carried by said frame structure and disposed to hold said knife means out of the winding path of said tape when the machine is in said "off" position, means actuated by said motor for moving said knife support means and said knife means, during the final revolution of a taping operation, into cutting position in the winding path of said tape, cut-off cam means on said tape winding ring disposed to engage said knife means when in said cutting position during said final revolution of said tape winding ring and to move said knife means radially of said winding ring to cut off said tape, means for withdrawing said knife means after the tape is cut off and during said final revolution of said winding ring, and means for retracting said knife support means and said knife means out of the winding path of said tape after said tape is cut off during the final revolution of said winding ring in a taping operation.

17. A taping machine, having an "off" position at which the machine stops on completion of a taping operation, comprising a frame structure, a split tape winding ring having a slot therein and rotatably supported on said frame structure, tape carrying means on said winding ring adapted to carry a supply of tape, driving means for said winding ring whereby continuous rotation of said ring will occur during a taping operation and the tape will be moved in a winding path around the article to be taped, said frame structure having an article receiving slot extending substantially to the center of rotation of said driving ring and adapted, when the machine is in said "off" position with the slot in said ring and the slot in said frame aligned, to receive the article to be taped, a retractable stop finger disposed in the winding path of the tape when the machine is in said "off" position, a retractable gripper finger adapted to be disposed in the winding path of the tape and to coact with said stop finger and grip the end of the tape therebetween when the machine is in said "off" position, knife means, disposed out of the winding path of the tape when the machine is in said "off" position, for cutting off said tape at the end of a winding operation, control means actuated by said driving means for said tape winding ring for controlling said stop finger, gripper finger, and knife means whereby during the first revolution of said winding ring after the machine is startred from said "off" position the tape will be released from between said stop and gripper fingers and said fingers will be retracted out of the winding path of the tape and, during the last revolution of said winding ring before a taping operation is completed, said stop finger and gripper finger will be returned to the winding path of the tape and the tape gripped therebetween and said knife means will be moved into the winding path of the tape and cut off the tape, and clutch means between said driving means and said control means for permitting a predetermined number of intermediate revolutions of said tape winding ring between the first and final revolutions thereof in a taping operation while maintaining said stop finger, gripper finger, and knife means in their retracted positions.

18. A taping machine, having an "off" position at which the machine stops on completion of a taping operation, comprising a frame structure, a split tape winding ring having a slot therein and rotatably supported on said frame structure, tape carrying means on said winding ring adapted to carry a supply of tape, driving means for said winding ring whereby continuous uninterrupted rotation of said split ring will occur during a taping operation and the tape will be moved in a winding path around the article to be taped, said frame structure having an article receiving slot extending substantially to the center of rotation of said driving ring and adapted, when the machine is in said "off" position with the slot in said ring and the slot in said frame aligned, to receive the article to be taped, a retractable stop finger disposed in the winding path of the tape when the machine is in said "off" position, a retractable gripper finger adapted to be disposed in the winding path of the tape and to coact with said stop finger and grip the end of the tape therebetween when the machine is in said "off" position, knife means, disposed out of the winding path of the tape when the machine is in said "off" position, for cutting off said tape at the end of a winding operation, and control means actuated by said driving means for said tape winding ring for controlling said stop finger, gripper finger, and knife means whereby during the first revolution of said winding ring after the machine is started from said "off" position the tape will be released from between said stop and gripper fingers and said fingers will be retracted out of the winding path of the tape, and, during the last revolution of said winding ring before a taping operation is completed, said stop finger and gripper finger will be returned to the winding path of the tape and the tape gripped therebetween and said knife means will be moved into the winding path of the tape and cut off the tape.

References Cited in the file of this patent
UNITED STATES PATENTS
2,834,499   Semkow _____ May 13, 1958